United States Patent
Wu

(10) Patent No.: US 9,231,423 B2
(45) Date of Patent: Jan. 5, 2016

(54) ELECTRIC VEHICLE SUPPLY EQUIPMENT AND CONTROL METHOD THEREOF

(71) Applicant: Chen-Kuan Wu, Taipei (TW)

(72) Inventor: Chen-Kuan Wu, Taipei (TW)

(73) Assignee: MITAC INTERNATIONAL CORP., Kuei-Shan Dist., Taoyuan (TW)

( * ) Notice: Subject to any disclaimer, the term of this patent is extended or adjusted under 35 U.S.C. 154(b) by 487 days.

(21) Appl. No.: 13/762,330

(22) Filed: Feb. 7, 2013

(65) Prior Publication Data
US 2014/0217971 A1 Aug. 7, 2014

(51) Int. Cl.
*H02J 7/00* (2006.01)
*H02J 7/02* (2006.01)
*B60L 3/00* (2006.01)
*B60L 3/04* (2006.01)
*B60L 11/18* (2006.01)

(52) U.S. Cl.
CPC ............ *H02J 7/0052* (2013.01); *B60L 3/0069* (2013.01); *B60L 3/04* (2013.01); *B60L 11/1816* (2013.01); *B60L 11/1824* (2013.01); *B60L 11/1846* (2013.01); *B60L 11/1861* (2013.01); *B60L 2240/36* (2013.01); *B60L 2240/525* (2013.01); *B60L 2240/527* (2013.01); *B60L 2240/529* (2013.01)

(58) Field of Classification Search
CPC ............................... Y02T 90/14; H02J 7/0042
USPC .................................................. 320/109, 111
See application file for complete search history.

(56) References Cited

U.S. PATENT DOCUMENTS

| | | | |
|---|---|---|---|
| 5,890,780 A | 4/1999 | Tomiyori | |
| 2011/0204849 A1* | 8/2011 | Mukai et al. | 320/111 |
| 2012/0091954 A1* | 4/2012 | Matsuki | 320/109 |
| 2012/0187905 A1* | 7/2012 | Kanayama | 320/109 |
| 2013/0207608 A1* | 8/2013 | Kawashima | 320/109 |
| 2013/0320934 A1* | 12/2013 | Kobayashi et al. | 320/162 |
| 2014/0062419 A1* | 3/2014 | Kasaya et al. | 320/160 |
| 2014/0091763 A1* | 4/2014 | Thommes et al. | 320/109 |

FOREIGN PATENT DOCUMENTS

JP 4631924 B2 2/2011
TW I332739 11/2010

* cited by examiner

*Primary Examiner* — Suresh Memula
(74) *Attorney, Agent, or Firm* — Winston Hsu; Scott Margo

(57) ABSTRACT

A voltage at an output end of a switch of an electric vehicle supply equipment is detected before charging an electric vehicle. An earth leakage circuit breaker is tripped for cutting off power inputted to the switch and preventing the output end from outputting the power when the voltage is higher than a first predetermined value. The switch is turned on for outputting the power from the output end to charge the electric vehicle when the voltage is lower than the first predetermined value. A current is detected at the output end. Power inputted to the switch is cut off for preventing the output end from outputting the power when the current is higher than a second predetermined value.

13 Claims, 5 Drawing Sheets

ELECTRIC VEHICLE SUPPLY EQUIPMENT AND CONTROL METHOD THEREOF

BACKGROUND OF THE INVENTION

1. Field of the Invention

The present invention is related to an electric vehicle supply equipment control method, and more particularly, to a method that prevents fail-to-danger scenario of the electric vehicle supply equipment.

2. Description of the Prior Art

FIG. 1 is diagram illustrating a prior art electric vehicle supply equipment 100. The electric vehicle supply equipment 100 may include a switch 102, a relay 104, a relay controller 106, a controller 108, a current detector 110, and a communication unit 112. The relay 104 is used to control turning the switch 102 on and off. An input end of the switch 102 is coupled to an AC power source 122 and an output end of the switch 102 is coupled to a connector 120 for connecting to an electric vehicle. The AC power source 122 may be 110 VAC, 220 VAC, or other commonly used utility AC power source voltages. The electric vehicle supply equipment 100 may communicate with the electric vehicle via the communication unit 112 so that the communication unit 112 may verify that the connector 120 has been connected to the electric vehicle and the electric vehicle is ready to be charged by utilizing a control pilot signal CP and a proximity pilot signal PP of the electric vehicle supply equipment communication protocol. Next, the communication unit 112 may inform the controller 108 to output a control signal for controlling the relay controller 106 to turn on the relay 104 in order to turn on the switch 102 by the relay 104. After the switch 102 has been turned on, the AC power source 122 may be outputted to the connector 120 of the switch 102, which is connected to the electric vehicle, and begins to charge the electric vehicle.

The current detector 110 is utilized as a protection mechanism of the electric vehicle supply equipment 100. If a current outputted to the electric vehicle is higher than a predetermined value, the controller 108 controls the relay controller 106 for cutting off the switch 102 to avoid danger. However, if at least one of power components such as the switch 102, the relay 104, or the relay controller 106 of the electric vehicle supply equipment 100 fails, such as an abnormal short circuit happens, the aforementioned protection mechanism may not provide proper protection to prevent danger from happening. For example, if the switch 102 is short circuited, the AC power source 122 may deliver power to the connector 120 before the connection condition between the connector 120 and the electric vehicle and the electric vehicle's charge condition are confirmed by the communication unit 112, resulting in a fail-to-danger scenario.

Therefore, the switch 102, the relay 104, and other power components of the electric vehicle supply equipment 100 must be selected from components having safety levels higher than specific levels of SIL safety approval such as SIL2 or SIL3. Due to the fact that components meeting these levels of approval are expensive and difficult to purchase, it is the scope of the present invention to improve the protection mechanism of the electric vehicle supply equipment so as to meet the specific levels of SIL safety approval by using components with lower cost which are also easy to purchase.

SUMMARY OF THE INVENTION

An embodiment of the present invention discloses an electric vehicle supply equipment control method. The method comprises detecting a voltage at an output end of a switch of the electric vehicle supply equipment before charging an electric vehicle. An earth leakage circuit breaker is tripped for cutting off power inputted to the switch and preventing the output end from outputting the power when the voltage at the output end is higher than a first predetermined value. The switch is turned on for outputting the power from the output end to charge the electric vehicle when the voltage at the output end is lower than the first predetermined value. Detect a current at the output end. Power inputted to the switch is cut off for preventing the output end from outputting the power when the current at the output end is higher than a second predetermined value.

Another embodiment of the present invention discloses an electric vehicle supply equipment. The equipment comprises a switch, a voltage detector, a first relay, a first relay controller, a second relay, a second relay controller, a controller, a current detector, and a communication unit. The voltage detector is for detecting a voltage at an output end of the switch. The first relay is coupled to the switch for controlling the switch. The first relay controller is coupled to the first relay for controlling the first relay. The second relay is for tripping an earth leakage circuit breaker when the voltage at the output end is higher than a predetermined value. The second relay controller is coupled to the second relay for controlling the second relay. The controller is coupled to the voltage detector, the first relay controller, and the second relay controller for controlling the first relay controller and the second relay controller according to the voltage at the output end. The current detector is coupled to the controller for detecting a current at the output end. The communication unit is coupled to the controller for communicating with an electric vehicle.

According to embodiments of the present invention, failure of a single component will not cause danger, thus the design of the electric vehicle supply equipment of the present invention can meet safety level SIL4 even though power components such as switches and relays do not meet safety levels above SIL2 or SIL3. As a result, component costs are lowered and manufacturing lead times are shortened. Furthermore, safety of the electric vehicle supply equipment is improved and dangerous conditions may be avoided.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
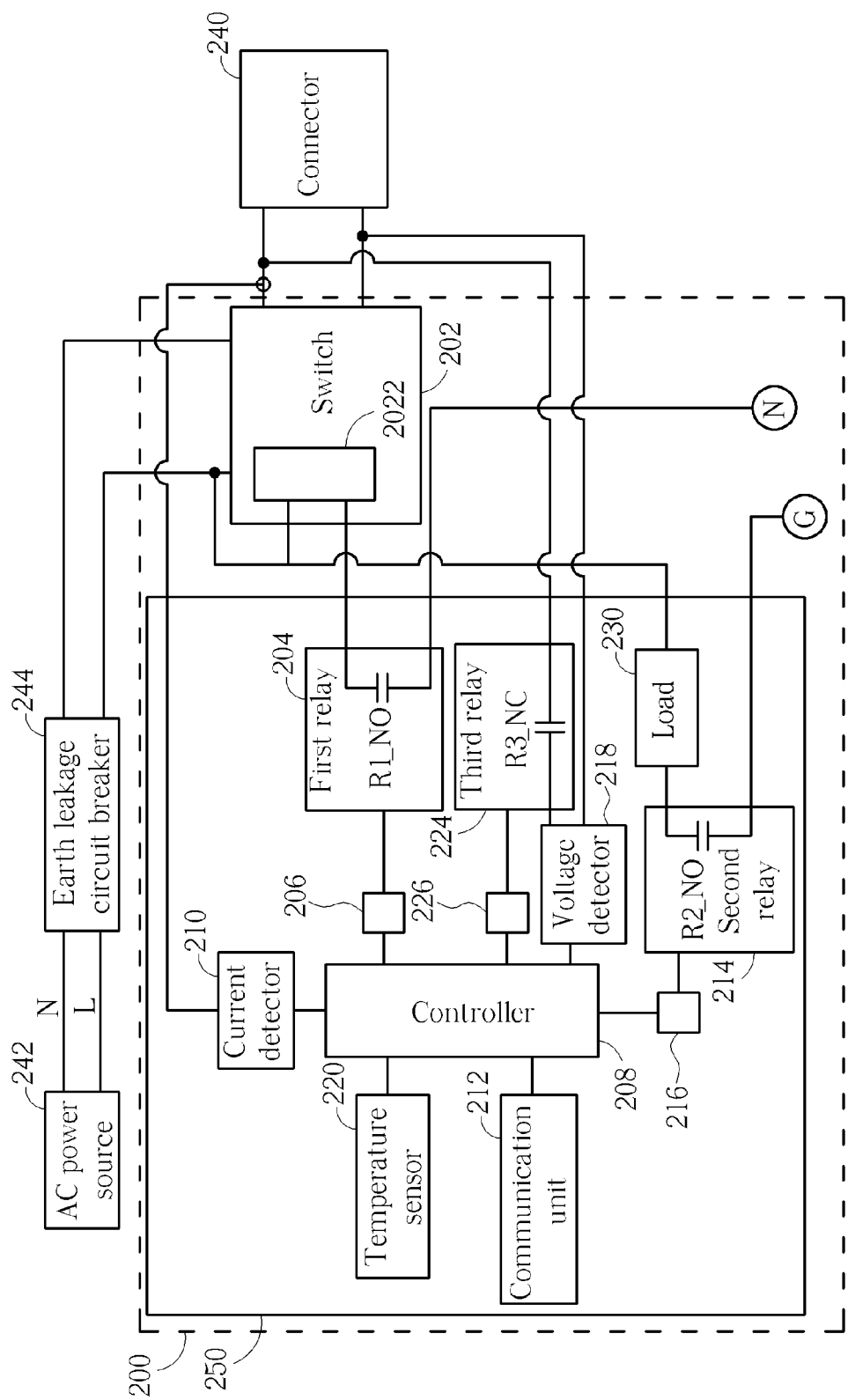
FIG. 2A is a diagram illustrating an electric vehicle supply equipment according to an embodiment of the present invention.

FIG. 2A is a diagram illustrating an electric vehicle supply equipment 200 according to an embodiment of the present invention. The electric vehicle supply equipment 200 may include a switch 202, a first relay 204, a first relay controller 206, a controller 208, a current detector 210, a communication unit 212, a voltage detector 218, a second relay 214, a second relay controller 216, a temperature sensor 220, a third relay 224, a third relay controller 226, and a load 230. Components other than the switch 202 of the electric vehicle supply equipment 200 may be disposed on a printed circuit board 250.

The switch 202 of FIG. 2A may be a magnetic switch having a coil 2022. The switch 202 may be turned on when current flows through the coil 2022. The switch 202 has an input end coupled to an AC power source 242 via an earth leakage circuit breaker 244. The switch 202 has an output end coupled to a connector 240. The connector 240 is used to connect to an electric vehicle. In this embodiment, the AC power source 242 may be single phase utility power source. The AC power source 242 may include Line (L) and Neutral (N). The first relay 204, the second relay 214, and the third relay 224 may be single pole single throw (SPST) type relays or other types of relays. The first relay 204 and the second relay 214 may be normally open (NO) relays and are marked as R1_NO and R2_NO. The third relay 224 may be a normally closed (NC) relay and is marked as R3_NC. The first relay controller 206, the second relay controller 216, and the third relay controller 226 may be circuits including multiple power transistors.

Figure 1:
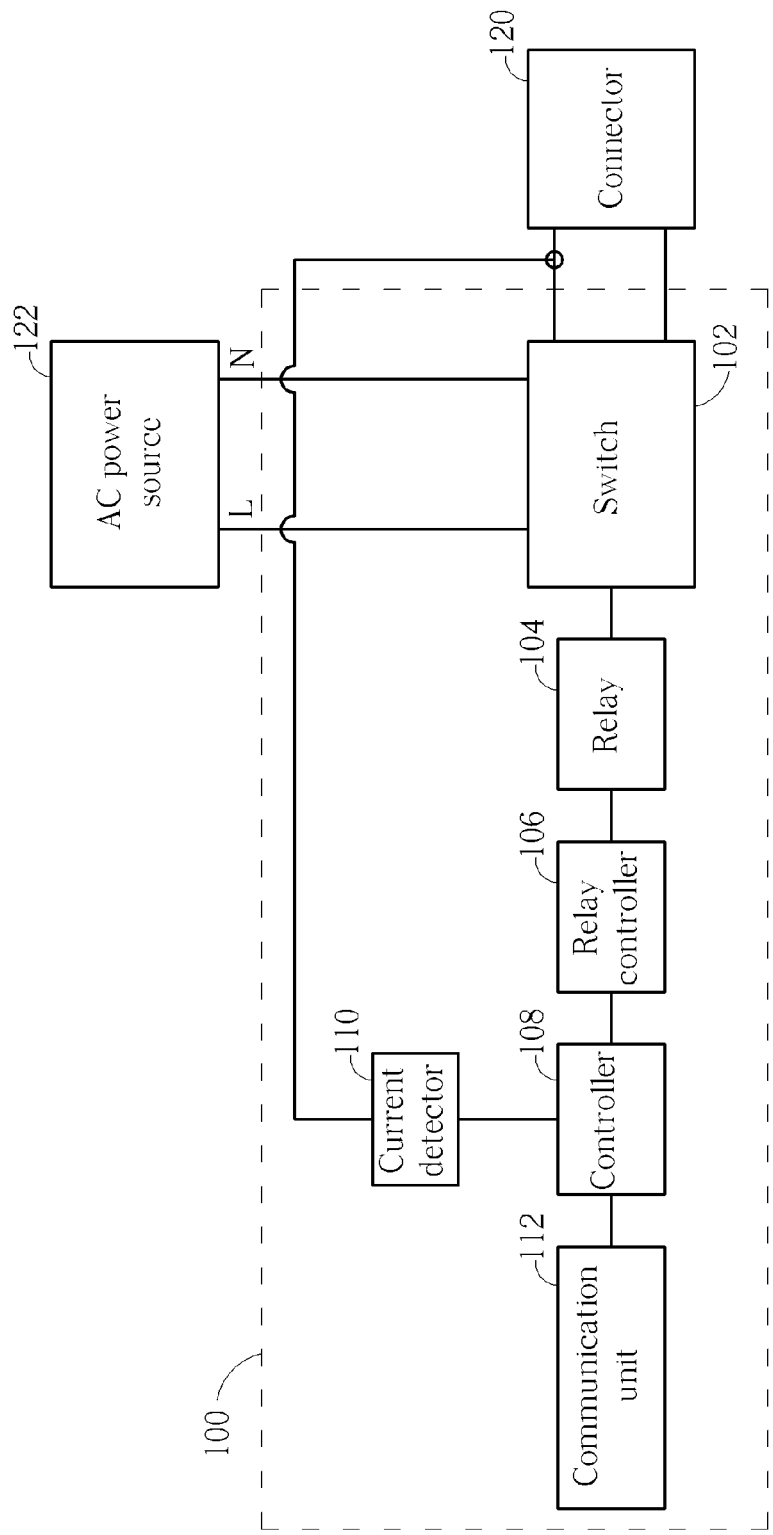
FIG. 1 is diagram illustrating a prior art electric vehicle supply equipment.

The voltage detector 218 is coupled to the controller 208. The third relay 224 may be coupled between the voltage detector 218 and the output end of the switch 202 for controlling a connection between the voltage detector 218 and the output end of the switch 202. Namely, the voltage detector 218 may detect a voltage at the output end of the switch 202, which is also the voltage at the connector 240, when the third relay 224 is turned on. The third relay controller 226 is coupled to the third relay 224 for controlling the third relay 224. The first relay 204 is coupled to the switch 202 for controlling turning the switch 202 on and off, namely, when the first relay 204 is turned on, current may flow from Line L of the AC power source 242 to the coil 2022 of the switch 202 then to Neutral N through the first relay 204, forming a closed loop to turn on the switch 202. The first relay controller 206 is coupled to the first relay 204 for controlling the first relay 204. The second relay 214 is coupled to the load 230 and when the second relay 214 is turned on, the load 230 may assist the second relay 214 to trip the earth leakage circuit breaker 244. The second relay controller 216 is coupled to the second relay 214 for controlling the second relay 214. The controller 208 is coupled to the first relay controller 206, the second relay controller 216, and the third relay controller 226. The current detector 210 is coupled to the controller 208 for detecting a current at the output end of the switch 202 and functioning as a protection mechanism as in FIG. 1. The communication unit 212 is coupled to the controller 208 for communicating with the electric vehicle in the same way as the communication unit 112 of FIG. 1 does. The temperature sensor 220 is coupled to the controller 208 for sensing temperature of the electric vehicle supply equipment 200 and the electric vehicle supply equipment 200 will stop operating when the temperature is too high. The temperature sensor 220 may be disposed in the same housing containing the printed circuit board 250.

Figure 2B:
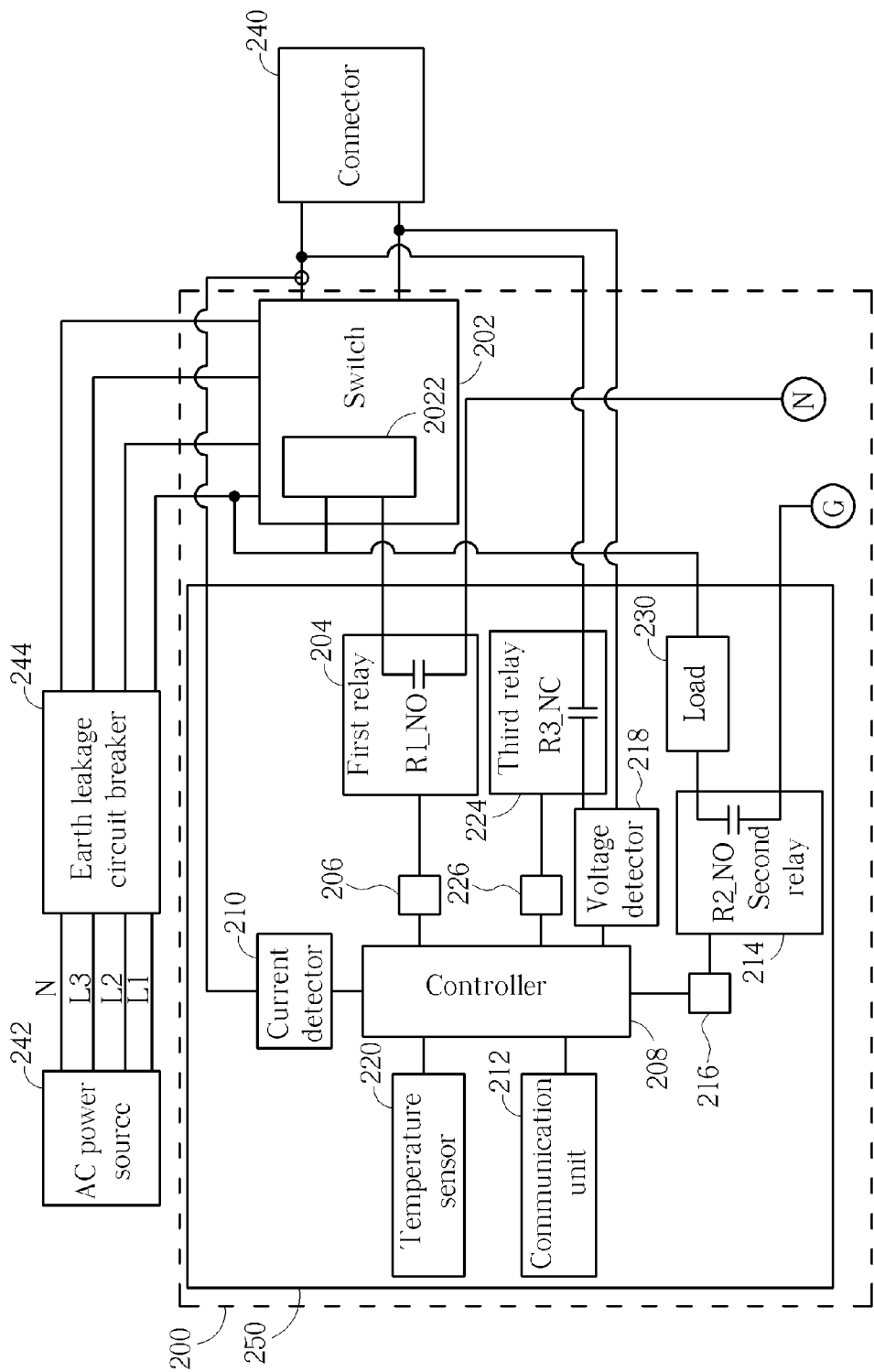
FIG. 2B is a diagram illustrating the electric vehicle supply equipment according to another embodiment of the present invention.

FIG. 2B is a diagram illustrating the electric vehicle supply equipment 200 according to another embodiment of the present invention. The AC power source 242 of the embodiment of FIG. 2B may be a three phase utility power source, which may include three Lines L1, L2, L3, and Neutral N. The switch 202 of FIG. 2B may be a three phase magnetic switch and the earth leakage circuit breaker 244 may be a three phase earth leakage circuit breaker. Other components and circuits are similar to FIG. 2A.

Figure 2C:
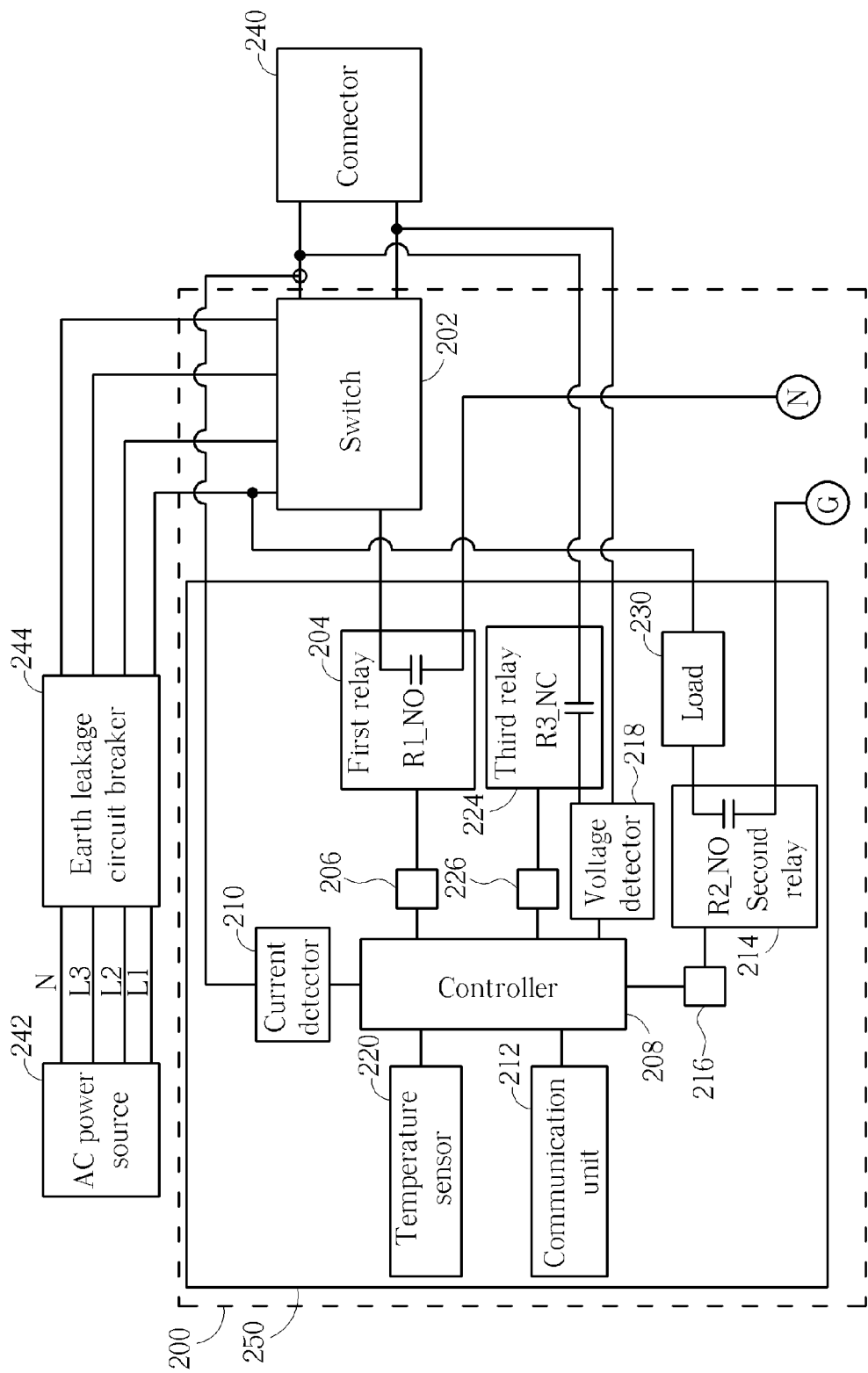
FIG. 2C is a diagram illustrating the electric vehicle supply equipment according to another embodiment of the present invention.

FIG. 2C is a diagram illustrating the electric vehicle supply equipment 200 according to another embodiment of the present invention. The switch 202 of FIG. 2C may be a three phase solid state relay (SSR). The solid state relay may be a photo coupler controlled type or other types of solid state relays. The first relay 204 of FIG. 2C may control the switch 202 with no coil 2022, instead, the first relay 204 may control turning the solid state relay on and off via a control end of the solid state relay. In another embodiment, the switch 202 of FIG. 2C may be a signal phase solid state relay and may be utilized to transfer power of the signal phase AC power source 242 of FIG. 2A.

Figure 3:
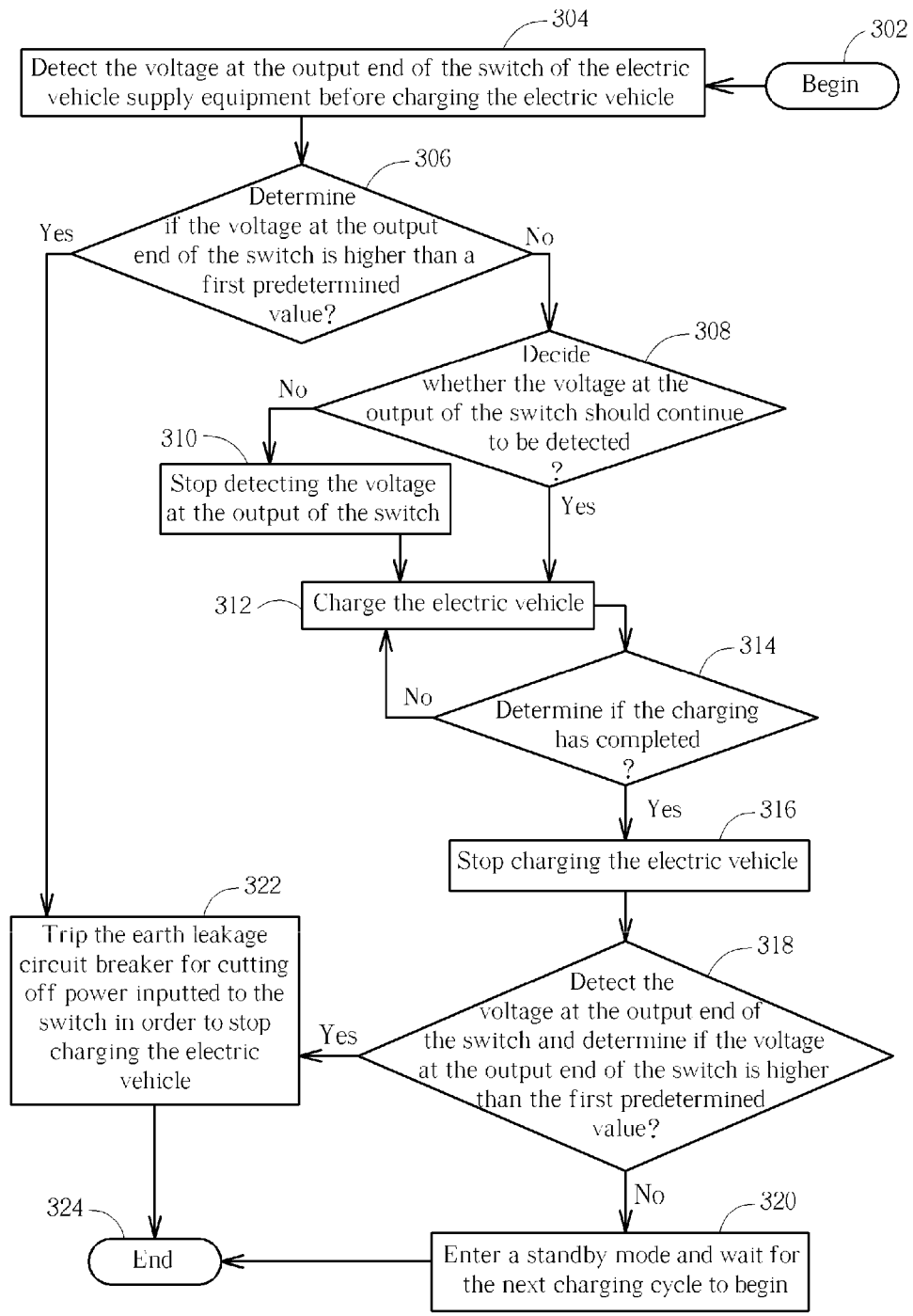
FIG. 3 is a control method for controlling the electric vehicle supply equipment according to an embodiment of the present invention.

Please refer to FIG. 2A to 2C and FIG. 3. FIG. 3 is a control method 300 for controlling the electric vehicle supply equipment 200 of embodiments described above according to an embodiment of the present invention. The control method 300 may include the following steps.

Step 302: Begin.

Step 304: Detect the voltage at the output end of the switch 202 of the electric vehicle supply equipment 200 before charging the electric vehicle.

Step 306: Determine if the voltage at the output end of the switch 202 is higher than a first predetermined value; if so, perform step 322; if not, perform step 308.

Step 308: Decide whether the voltage at the output of the switch 202 should continue to be detected; if so, perform step 312; if not, perform step 310.

Step 310: Stop detecting the voltage at the output of the switch 202.

Step 312: Charge the electric vehicle.

Step 314: Determine if the charging has completed; if so, perform step 316; if not, perform step 312.

Step 316: Stop charging the electric vehicle.

Step 318: Detect the voltage at the output end of the switch 202 and determine if the voltage at the output end of the switch 202 is higher than the first predetermined value; if so, perform step 322; if not, perform step 320.

Step 320: Enter a standby mode and wait for the next charging cycle to begin.

Step 322: Trip the earth leakage circuit breaker 244 for cutting off power inputted to the switch 202 in order to stop charging the electric vehicle.

Step 324: End.

In step 304 and 318, the controller 208 may control the third relay controller 226 to turn on the third relay 224 for establishing the connection between the voltage detector 218 and the output end of the switch 202 so as to detect the voltage at the output end of the switch 202 by utilizing the voltage detector 218. The detected voltage value may be transmitted to the controller 208 for succeeding operations. In step 306 and 318, the controller 208 may determine if the voltage at the output end of the switch 202 is higher than the first predetermined value according to the detected voltage value. The first predetermined value may be zero volts, which indicates that there is no voltage on the output end and it is safe to perform charging operations. In step 308, the controller 208 may decide whether or not to continue detecting the voltage at the output end of the switch 202. In step 310, the controller 208 may control the third relay controller 226 to turn off the third relay 224 for stopping detecting the voltage at the output end of the switch 202. In step 312, the controller 208 may control the first relay controller 206 to turn on the first relay 204 and further to turn on the switch 202 in order for the AC power source 242 to deliver power through the switch 202 and the connector 240 to charge the electric vehicle. In step 314, the controller 208 may determine if the charging of the electric vehicle has been completed. In step 316, the controller 208 may control the first relay controller 206 to turn off the first relay 204 and further to turn off the switch 202 for stopping power from the AC power source 242 flowing through the switch 202 and the connector 204 so as to stop charging the electric vehicle. In step 322, the controller 208 may control the second relay controller 216 to turn on the second relay 214, and after the second relay 214 has been turned on, the second relay 214 and the load 230 in series may form a current path, which forms a loop between any one of Line L, L1, L2, or L3 of the AC power source 242 and a ground end G, thereby purposely resulting in leakage current between the AC power source 242 and the ground end G so as to trip the earth leakage circuit breaker 244 for cutting off power inputted to the switch 202, thus there will be no voltage at the output end of the switch 202. As a result, an additional protection mechanism other than the current detector 210 is introduced to the electric vehicle supply equipment 200.

In each step of the method 300, the current detector 210 may detect the current of the output end of the switch 202, and when the current of the output end is higher than a second predetermined value, the current detector 210 may inform the controller 208 to control the first relay 204 to turn off the switch 202 in order to avoid danger. In another embodiment, when the current of the output end is higher than the second predetermined value, the current detector 210 may inform the controller 208 to control the second relay 214 to trip the earth leakage circuit breaker 244 for cutting off power inputted to the switch 202 and preventing the switch 202 from outputting power to avoid danger.

In another embodiment, the third relay 224 and the third relay controller 226 may be removed from the electric vehicle supply equipment 200, and the voltage detector 218 may be coupled between the controller 208 and the output end of the switch 202 directly for detecting the voltage at the output end of the switch 202 continuously. In this embodiment, steps 308 and 310 may be omitted. In another embodiment, the temperature sensor 220 may be removed from the electric vehicle supply equipment 200, whereas operations of this embodiment are the same as shown in FIGS. 2A to 2C and FIG. 3.

In summary, embodiments of the present invention disclose the electric vehicle supply equipment 200 capable of detecting the voltage at the output end of the switch 202, which is the voltage at the connector 240, and the control method thereof. The voltage at the output end of the switch 202 of the electric vehicle supply equipment 200 is detected before charging the electric vehicle, and the electric vehicle supply equipment 200 only begins to charge the electric vehicle when the voltage at the output end is lower than the first predetermined value, that is, there is no power at the connector 204 and there is no abnormal short circuit condition among power components such as the switch 202, the first relay 204, or the first relay controller 206, thereby introducing the additional protection mechanism. The additional protection mechanism may prevent the fail-to-danger scenario from happening. If the fail-to-danger scenario is going to happen, the earth leakage circuit breaker 244 is tripped purposely to avoid that kind of scenario from happening. Therefore, failure of a single component in the electric vehicle supply equipment 200 will not cause danger, thus the design of the electric vehicle supply equipment 200 of the present invention can meet safety level SIL0 even though power components such as switches and relays do not meet safety levels above SIL2 or SIL3. As a result, component costs are lowered and manufacturing lead times are shortened. Furthermore, safety of the electric vehicle supply equipment is improved and dangerous conditions may be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electric vehicle supply equipment control method comprising:
   detecting a voltage at an output end of a switch of the electric vehicle supply equipment before charging an electric vehicle;
   tripping an earth leakage circuit breaker for cutting off power inputted to the switch and preventing the output end from outputting the power when the voltage at the output end is higher than a first predetermined value;
   detecting a current at the output end; and
   cutting off power inputted to the switch for preventing the output end from outputting the power when the current at the output end is higher than a second predetermined value.

2. The method of claim 1 further comprising:
   turning on the switch for outputting the power from the output end to charge the electric vehicle when the voltage at the output end is lower than the first predetermined value.

3. The method of claim 2 further comprising:
   cutting off the switch after the charging has been completed;
   detecting the voltage at the output end; and
   tripping the earth leakage circuit breaker for cutting off power inputted to the switch when the voltage at the output end is higher than the first predetermined value.

4. The method of claim 3 further comprising:
   entering a standby mode when the voltage at the output end is lower than the first predetermined value.

5. The method of claim 1 further comprising:
   stopping detecting the voltage at the output end when the voltage is lower than the first predetermined value; and
   turning on the switch for outputting the power from the output end to charge the electric vehicle.

6. The method of claim 5 further comprising:
   cutting off the switch after the charging has completed;
   detecting the voltage at the output end; and
   tripping the earth leakage circuit breaker for cutting off power inputted to the switch when the voltage at the output end is higher than the first predetermined value.

7. The method of claim 6 further comprising:
   entering a standby mode when the voltage at the output end is lower than the first predetermined value.

8. The method of claim 1 wherein the first predetermined value is zero volts and the switch is a magnetic switch or a solid state switch (SSD).

9. An electric vehicle supply equipment comprising:
   a switch;
   a voltage detector for detecting a voltage at an output end of the switch;
   a first relay coupled to the switch for controlling the switch;
   a first relay controller coupled to the first relay for controlling the first relay;
   a second relay for tripping an earth leakage circuit breaker when the voltage at the output end is higher than a predetermined value;
   a second relay controller coupled to the second relay for controlling the second relay;

a controller coupled to the voltage detector, the first relay controller, and the second relay controller for controlling the first relay controller and the second relay controller according to the voltage at the output end;

a current detector coupled to the controller for detecting a current at the output end; and a communication unit coupled to the controller for communicating with an electric vehicle.

10. The equipment of claim 9 further comprising a temperature sensor coupled to the controller for detecting temperature of the electric vehicle supply equipment.

11. The equipment of claim 9 further comprising:

a third relay coupled between the voltage detector and the output end for controlling a connection between the voltage detector and the output end; and a third relay controller coupled between the third relay and the controller for controlling the third relay;

wherein the third relay controller turns on the third relay for detecting the voltage at the output end before charging the electric vehicle.

12. The equipment of claim 11 further comprising a load coupled to the second relay for assisting the second relay to trip the earth leakage circuit breaker.

13. The equipment of claim 12 wherein the switch is a magnetic switch or a solid state switch.

* * * * *